United States Patent Office 2,758,831
Patented Aug. 14, 1956

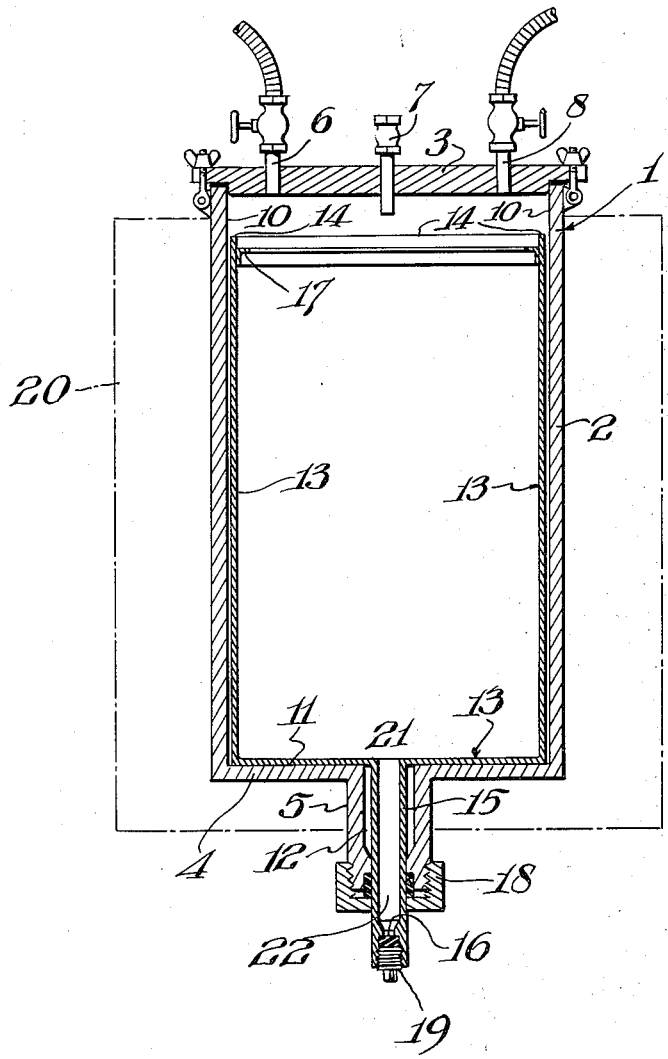

2,758,831

LINED METAL REDUCTION APPARATUS

Charles H. Winter, Jr., Wilmington, Del., assignor to E. I. du Pont de Nemours and Company, Wilmington, Del., a corporation of Delaware Original application April 27, 1949, Serial No. 89,870. Divided and this application May 5, 1953, Serial No. 353,088

3 Claims. (Cl. 266—24)

This invention relates to the preparation of titanium and zirconium metals through reduction of their halides. More particularly it relates to the production of these metals in relatively pure condition and by reduction of a halide thereof, especially a tetrachloride, with another metal having a higher reduction potential than that of titanium or zirconium.

This application is a division of my copending application Serial No. 89,870, filed April 27, 1949, now abandoned.

Various processes for the production of elementary titanium and zirconium have been proposed. Interest in these metals has become greatly accelerated due to a greater realization of their physical and chemical properties. Thus, titanium has been found to have a very high ratio of strength to weight, rendering it particularly attractive for aviation and other uses. In such prior methods, reduction of the metal halide is effected with elements such as magnesium, calcium, sodium and lithium with simultaneous formation of the halide of the reducing metal. Although a very simple chemical reaction is involved, the metal sponge which results is made up of a mixture of the metal halide reaction product and residual reducing agent. These contaminants are present in liquid form during the reaction but upon cooling prior to withdrawal of the reaction product from the furnace exist in distributed, solid condition throughout the sponge metal reaction mass. Separation and recovery of the metal from this sponge must then be undertaken, which involves a tedious, time-consuming and difficult operation.

It is an object of this invention to overcome the disadvantages of prior methods for producing titanium and zirconium metals, and in particular to provide a novel process for effecting the ready manufacture and recovery of these metals by a method which is characterized by increased simplicity and ease of operation. An additional object is to provide an improved method for recovering by-product metal halides from the metal sponge reaction product. A further object is to provide novel means for conducting the titanium and zirconium halide reducing operation which permits one to segregate the halide reduction product prior to its solidification in the final sponge metal reaction product. A still further object is to provide a novel, simplified reaction vessel wherein sponge metal can be produced and readily separated from the reducing metal halide reaction product formed during the process. Other objects and advantages of the invention will be apparent from the following description and from the accompanying, diagrammatic drawings in which there is shown a vertical, sectional view of one useful form of apparatus for carrying out the invention.

These and other objects are attainable in this invention which comprises forming elemental, pure titanium or zirconium metal through reduction of a halide thereof within a removable metal liner of low carbon steel sheeting in a reaction vessel, said liner being shaped to conform to the internal surface of said vessel and having a tapping outlet or draw-off in the base portion thereof which is co-axially arranged within an outlet in the base of the main reactor, whereby withdrawal and removal from said reactor and its contained metal reaction product can be effected during the process of any contaminating metal halides or products formed during the reduction operation.

Referring to the accompanying drawing which is illustrative of one practical and preferred form of apparatus for carrying out the invention, there is shown a permanent reaction vessel composed of corrosion-resistant metal, alloy or other suitable material, the side walls 2 of which are relatively thick and upon which is disposed a suitable removable closure or cover element 3. The lower or base portion 4 of said reactor terminates in the form of a descending, annular neck or enlarged discharge outlet 5. The cover 3 is provided with suitable conduits 6 and 7 through which an inert gas, such as argon, and a titanium halide, such as titanium tetrachloride, can be separately and conveniently introduced, as desired, into the reactor from suitable sources of supply (not shown). A vent or like suitable opening 8 is also provided in said cover to maintain or control, as desired, the pressure which is to prevail within the reactor during the reduction.

Interiorly and cooperatively disposed within the reactor and formed or shaped to conform to the configuration of reactor side wall surfaces 10, base wall surfaces 11, and annular discharge outlet surfaces 12, is an open-ended metal casing or liner 13 made up of relatively thin, low carbon steel sheeting or similar relatively cheap metallic sheeting material. The upper limit 14 of said liner terminates short of the upper limits of the vertical walls 2 of the reactor and at a point above the level of the mass to be reacted within said liner and reactor. A restricted, downwardly-extending annular neck or outlet portion 15, terminating in a tap-hole or discharge spout 16, is provided in the base or bottom portion of the liner so that when the liner is in operative position within the reactor, said liner outlet 15 will be co-axially disposed within and extend through the enlarged reactor outlet 5. Suitable securing means such as ring or lug elements 17 are provided on the top or upper portion of the internal surfaces of liner 13 which elements serve to facilitate the handling, removal and replacement of the liner within the reactor. A conventional stuffing box 18 or like means is employed about the enlarged outlet 5 to effect a closure and sealing of said outlet 5 and the associated neck portion 15 of the liner through such neck portion descends, while a conventional seal cup or like means 19 is fitted for disengaging relationship within or over the liner tap-hole 16 to check or otherwise control withdrawal of metal halide salt or other contaminating products from the reactor, either periodically or as formed during the reducing operation.

In the operation of a device of the type described, a sufficient charge of suitable reducing metal, such as magnesium, is introduced into reactor 1 and within its contained removable casing and liner 13. Reactor cover 3 is then secured thereto in air-tight relationship, care being observed, in the meantime, that stuffing box 18, packed with fibrous silica or other suitable media, and seal cup 19 are also suitably sealed against leakage. An inert gaseous atmosphere is then provided for and maintained within the reactor by the introduction through inlet 6 of argon or other inert gas, while pressure conditions within the reactor are maintained in suitable, adjusted extent by means of the vent 8. Heat is then applied to the reactor by means of an electrical or other suitable type of conventional furnace or heating unit 20 enclosing the reactor and adapted to melt the magnesium reducing metal present therein and maintain reactor temperatures ranging from about 750–1100° C. Upon reduction of the magnesium to molten state, a halide of the metal being reduced, such as liquid titanium tetrachloride, is introduced via the inlet 7 at a controlled rate into the reactor, to become immediately vaporized therein and be reacted with the reducing metal, thereby forming the desired free titanium or zirconium metal sponge, which secures itself to and bridges across the liner 13 for subsequent removal with said liner and recovery from the reactor. The released halogen forms the corresponding halide salt of the reducing metal, which settles to the bottom of the reactor and flows downwardly into the annular neck or outlet portion 15 of the liner 13. Upon emerging from the hot reaction zone 21 and being passed into the relatively cooler section or zone 22 of said liner outlet 15 which is adjacent its tap-hole 16 and seal cup 19, the molten reducing metal halide by-product is cooled and solidified to check further withdrawals of such by-product from within the reactor. When it is desired to effect its removal and separation from the metal sponge within the reactor upon completion of the reaction, this can be readily effected by applying an amount of external heat, through any suitable means (not shown), to said section 22 sufficient to melt the frozen mass within the zone 22 and seal cup 19, and upon removal of the latter, allowing undesired reaction by-product to drain from the system through the tapping means 16. Thereafter, the equipment is cooled down and the liner casing 13, together with its contained metal reaction product, is then withdrawn from the reactor by lifting with the aid of internal lugs 17 following removal of reactor cover 3. The sponge metal reaction product can be then recovered from said casing by stripping the latter therefrom and discarding it, or by boring the sponge on a lathe or chipping or chiseling it away from the casing. The recovered sponge can then be subjected to conventional purification treatment, formed into ingots or briquettes and fabricated into the desired metal or alloy.

To a clearer understanding of the invention, the following example is given. This is merely illustrative and not to be construed as limiting the underlying scope of the invention:

*Example I*

In an apparatus similar to that described, the magnesium reduction of titanium tetrachloride was effected. The apparatus comprised an externally-heated, cylindrical, nickel-bearing steel reaction vessel with an internal diameter of 12" and a height of 20". Within its reaction chamber a removable, open-ended .15% carbon steel liner having a .06" thickness, a diameter of only 11½", and a height of 19", was suitably fitted. The liner was so shaped as to conform to the internal configuration of said reaction vessel and was equipped, as in the instance of said vessel, with a bottom discharge spout arranged in co-axial relationship with a bottom outlet in the vessel. The reactor was maintained at a temperature of 850° C. by means of the external heater, and after all inlets thereto were sealed against the atmosphere, an argon atmosphere was maintained therein. 15 pounds of solid magnesium metal, previously charged into the retaining, protective liner, were then melted in this atmosphere. Liquid TiCl₄ was then introduced via an inlet in the upper portion of the reactor onto the surface of the molten magnesium, such introduction being effected at a rate of about 20 pounds per hour. The TiCl₄ liquid was immediately vaporized by the contained heat of the reactor and was thereupon reduced by the molten magnesium. Magnesium chloride formed during the process settled to the bottom of the reactor liner to flow through its descending co-axially disposed discharge spout and into a seal cup disposed over the discharge outlet of said spout. Due to the cooler state of such outlet, the chloride cooled and solidified within the spout and its associated seal cup to effectively prevent further by-product chloride discharge from the reactor. Titanium metal sponge from the reaction formed as an adhering mass upon the walls of the liner and bridged across between said walls. Magnesium chloride was drained from the reactor by remelting the frozen mass in the seal cup, thereby allowing the molten salts to flow from and again be drained out of the reactor to materially reduce their contaminating effect upon the titanium sponge. When essentially all of the reducing metal had been consumed by the reaction and the magnesium chloride tapped off, as indicated, the equipment was cooled and the liner, together with its contained titanium metal sponge, was lifted out of and removed from the reactor and conveyed for final purification treatment to separate vacuum distillation equipment. In this latter operation any remaining magnesium chloride or other contaminants in the sponge were removed, such treatment being effected at about 975–1000° C. with the aid of a high vacuum. Upon cooling of the purified charge, the liner was easily peeled away from the titanium sponge and the latter was then ready for melting, casting, or other conventional form of treatment or fabrication.

Following the reduction operation, examination of the permanent reactor vessel revealed that it was substantially unaffected by the involved reaction and the high temperature and corrosion conditions which prevail in such reaction. Thus, although the reactor was constructed of nickel-bearing steel which is normally attacked by molten magnesium, the presence and use of the removable liner afforded a most efficient protection for the vessel and obviously assured for it a much longer life of usefulness in reactions of this type. In addition, the titanium sponge prior to subjection to the purification treatment was found to contain only 27% of magnesium chloride, in contrast to a 78% content in instances where the sponge was recovered from a comparable process but wherein withdrawal of molten magnesium chloride during the process was not resorted to.

*Example II*

Example I was duplicated except that stoichiometric proportions of magnesium and zirconium chloride were subjected to reaction at a temperature of 825° C. As in the preceding example, a highly pure type of metal sponge product was recovered prior to the purification treatment operation.

While the invention has been described in its application to certain specific embodiments, it is not to be construed as restricted thereto. Thus, although magnesium has been employed as a preferred type of reducing agent, other metal reducing agents can also be used and substituted therefor. Magnesium is commercially most attractive for use herein because it is readily available in relatively pure and large quantities and has almost twice as much reducing power per unit weight as other reducing agents, such as sodium. In general, use is contemplated herein of any reducing metal which is more electropositive than the titanium or zirconium being produced. Metals which are especially useful include those which in aqueous solutions would have electrode potential values of 1.70 or greater, as shown by the Electromotive Force Series. Of these metals the alkali and alkaline earth metals are especially useful since their electrode potentials are all greater than 2.0, a fact which insures rapid reaction at the 750° C. or higher temperature normally employed in the process. Among specific examples of reducing metals contemplated, those of magnesium, calcium, barium, strontium, sodium, potassium or lithium, can be mentioned. These metals are molten at 750° C. or higher, have relatively low specific gravities, and form a liquid halide as a by-product in the involved reducing reaction, thereby enabling ready separation and removal, as desired, of such by-product from the metal sponge reaction product. Of the group mentioned, calcium and magnesium are preferred for use with magnesium being most preferred because of its indicated high potential and production of a residue in the reaction readily separated from the metal being produced.

The two metals adapted to be produced by reduction in this invention comprise titanium and zirconium. In their production any of their halides may be employed, particularly those in which the halogen component has an atomic number greater than 9, i. e., chlorine, bromine, or iodine. The chlorides, such as $TiCl_4$ and $ZrCl_4$, are particularly adaptable for use, are the most economical, practical and readily obtainable, and hence are preferred for employment. While the chlorides are preferred, the bromides, iodides or fluorides of these metals can also be employed. The fluorides are all solid and hence are not susceptible to ready introduction into the reactor. Also, the alkaline earth fluorides which result from their use are insoluble in water and therefore difficult to eliminate in the subsequent purification operation. Iodides and bromides are also solid at room temperature and, though utilizable, are economically disadvantageous for use because of their relatively high cost.

The only major difference between the titanium and zirconium producing processes is that when employing the tetrachlorides at atmospheric pressures, zirconium tetrachloride is a solid which sublimes at about 300° C., while titanium tetrachloride is a liquid at between —30° C. and 136.4° C. Since it is easier to admit gaseous zirconium chloride to the reaction chamber than the same compound in the solid state, one may readily elect to heat the reactant material to provide its admission to the system in a fluid condition or gaseous form. Thus, the chosen method of addition of the zirconium chloride may be different. Aside from this, these halides may be added in any desired form, either as solids, liquids, or vapors. If added as liquids or as solids, they become volatilized upon introduction into the heated reactor.

During the reduction operation the rate of reaction and the pressure prevailing within the reactor can be suitably controlled by resort to a neutral or inert atmosphere. While argon has been indicated as a preferred type of protective or inert gas, other inert gaseous elements of the Group O of the Periodic System, such as helium or neon, or mixtures thereof, can be used, as can any other protective and inert gas which is free from undesirable reactants, particularly oxygen and nitrogen. In employing argon, a substantial partial pressure of such gas within the reactor during the reaction is preferred. This is adjusted to 760 mm. or higher during the tapping operation to avoid air influx while the contents of the vessel are at or above the melting temperature of the metal halide reaction product. Alternatively, and if desired, atmospheric or pressures above atmospheric (say, from 1–3 atmospheres or higher) can be employed.

The liner or secondary reaction vessel employed herein need comprise only a very thin sheet metal, for instance, from .01 to .1 inch in thickness, and should consist of low carbon steel, i. e., steel having a carbon content of only .02 to .3% due to the tendency of titanium or zirconium to react with carbon at high temperatures. Preferably it is constructed of the same shape as, but slightly smaller than, the interior of the reactor itself. Its seam or seams should be welded or secured by similar material but lightly enough to allow it to be readily and easily stripped from the sponge metal product.

The temperatures employable in the process, though variable, are quite critical in that several factors may be correlated. The temperature of the reactor must be sufficient to maintain the reducing metal and the halide reaction product in molten state. At the same time, it must not be high enough to effect their substantial vaporization. Finally, there must be essentially no disadvantageous alloying of the liner with the product metal. The particular temperature chosen will depend upon the exact composition of the liner, the specific reducing metal employed, the metal being produced, and other like considerations. For example, in the reduction of titanium or zirconium tetrachloride by magnesium, the temperature must be higher than 712° C., for magnesium chloride melts at that temperature; magnesium itself is molten above about 651° C. The titanium or zirconium which is formed will begin to alloy with the steel at slightly above 1100° C. Hence, for this set of conditions, a temperature range of, say, 725° C. to 1100° C. is satisfactory for use, with a range of 800° C. to 900° C. being considered best and preferred.

As indicated above, many widely different variations of the invention may be resorted to without departing from the spirit and scope thereof. Hence, it is to be understood that the invention is not limited to the specific embodiments hereinabove set forth, except as defined in the appended claims.

I claim as my invention:

1. A metal reduction apparatus comprising in combination a reactor, inlet and outlet means therefor, a removable, open-ended sheet metal liner for retaining reactants and reaction products within said reactor disposed over the internal surfaces thereof and shaped to coincide with the entire configuration of said surfaces, securing means carried by said liner to facilitate its removal from said reactor, and a restricted tapping outlet means in the base of said liner for removing retained liquid reactants therefrom, said outlet being disposed in co-axial relationship with the reactor outlet, and means for sealing said outlets.

2. A metal reduction apparatus comprising in combination a cylindrical corrosion-resistant metal reactor, inlet and outlet means therefor, a removable, open-ended, thin, low carbon steel sheet metal liner for retaining reactants and reaction products within said reactor, disposed over the entire internal surfaces thereof and shaped to coincide with the configuration of said surfaces, securing means carried by said liner to facilitate its removal from said reactor, and a restricted outlet means provided in the base of said liner having a tapping spout co-axially interpositioned within said reactor outlet and through which retained liquid reaction products can be removed from the interior of said liner, and means for sealing said outlet and spout.

3. An apparatus for reducing a volatile metal halide with an active reducing metal comprising in combination a metal reactor having inlet and outlet means for introducing reactants and withdrawing reaction products, a thin, open-ended, removable sheet metal protective liner disposed internally of said reactor and shaped to conform to the entire surfaces of the latter and into which said reactants are charged and said reaction products retained, securing means carried by said liner to facilitate its removal from said reactor, and a restricted withdrawal tapping outlet means provided in the base of said liner and reactor through which retained by-products of reaction in liquid state can be withdrawn from said liner.

References Cited in the file of this patent

UNITED STATES PATENTS

| | | |
|---|---|---|
| 2,255,549 | Kruh | Sept. 9, 1941 |
| 2,556,763 | Maddex | June 12, 1951 |
| 2,663,634 | Stoddard et al. | Dec. 22, 1953 |

OTHER REFERENCES

Metal Progress, February 1949, page 195 relied on.